United States Patent [19]

Zweig

[11] 3,903,423
[45] Sept. 2, 1975

[54] SUNBURN DOSIMETER
[75] Inventor: Arnold Zweig, Westport, Conn.
[73] Assignee: American Cyanamid Company, Stamford, Conn.
[22] Filed: May 9, 1974
[21] Appl. No.: 468,619

[52] U.S. Cl. ................................. 250/474; 250/473
[51] Int. Cl.² ............................................. G01J 1/50
[58] Field of Search .................... 250/472, 473, 474

[56] References Cited
UNITED STATES PATENTS

| | | | |
|---|---|---|---|
| 2,949,880 | 8/1960 | Fromer | 250/474 X |
| 3,194,963 | 7/1965 | McKee | 250/474 X |
| 3,787,687 | 1/1974 | Trumble | 250/474 |

Primary Examiner—Archie R. Borchelt
Attorney, Agent, or Firm—Samuel Branch Walker

[57] ABSTRACT

The effect of radiant energy in the sunburn region, about 290 to 320 nanometers, on the human skin is estimated by comparing the color change of a test area having a compound which changes color as a function of the cumulative exposure to such radiation with at least one color standard area which matches the color attained by said test area after exposure to different predetermined quantities of such radiation.

8 Claims, 5 Drawing Figures

PATENTED SEP 2 1975　　　　　　　　　　　　　　3,903,423

SUNBURN DOSIMETER

BACKGROUND OF THE INVENTION

The hazards of becoming sunburned, that is, the human skin, or skin of other mammals, being burned by the rays of the sun has been recognized for a long time. More recently, it has become known that the sunburning rays of the sun are, in fact, invisible.

The burning rays are predominantly in the range of about 290 to 320 nanometers. The burning effect is rather unpredictable because the earth's atmosphere acts as a filter and becomes opaque to ultraviolet which is shorter than about 290 nanometers. Hence, the thickness of the atmosphere through which the rays must pass has a big effect on the intensity of the burning rays of the sun. For instance, in the winter when the sun's rays are at a grazing angle, the burning effect of the sun is reduced to a greater extent than the visible rays to which the earth's atmosphere is substantially transparent. Similarly, at high altitudes, even though the sun appears but slightly brighter to the human eye, the increase in intensity of the sun-burning rays of the sun is much greater than the casual observer would think to be the case, and at very high altitudes protective measures against the burning rays of the sun are an absolute requirement. Furthermore, the burning rays of the sun penetrate cloud cover better than visible light so that there are many times when an individual finds that he is sunburned even though the day was overcast and judging by the visible rays, the individual thought it could not possible be intense enough to burn. In this, as in other fields, the school of experience can be the best teacher but at times the tuition is undesirably high.

The intensity in the spectral region of 290 to 320 nanometers must be measured directly because it varies with the time of day, the time of year and cloud cover in ways which are not directly proportional to the total light flux.

Attempts have been made to protect the exposed human skin by using lotions and ointments which absorb the shorter waves, particularly, the ultraviolet with wavelengths shorter than around 330 or 340 nanometers. A great deal of the tanning action of the sun results from the sun's rays between about 320 and about 400 nanometers so that, if properly filtered, a considerable increase in the ratio of tanning to burning rays can be obtained.

ULTRAVIOLET RADIATION, Lewis R. Koller, 2nd Edition, John Wiley, New York, 1965, particularly pages 226 to 232, gives data on the erythemal effects of ultraviolet radiation. About 2967 A gives the peak effect with minimum perceptible erythema (MPE) being produced by 250,000 ergs per $cm^2$.

An informative discussion of ultraviolet radiation appears in STRATOSPHERIC OZONE DEPLETION AND SOLAR ULTRAVIOLET RADIATION ON EARTH, P. Cutchis, Science, 184, pages 13 to 19, Apr., 5, 1974.

Attempts have been made to measure the intensity of the burning rays of the sun. U.S. Pat. No. 3,742,240, Jonasson, METER FOR MEASURING TANNING CAPABILITY OF SUNLIGHT, uses a selenium photovoltaic barrier layer cell with a filter which passes only ultraviolet radiation between 300 and 390 millimicrons (nanometers) to give a measuring of the tanning capability at any given moment. Another complex circuit would be required for integrating the exposure.

U.S. Pat. No. 3,710,115, Jubb, Jan. 9, 1973, SUNBURN WARNING DEVICE COMPRISING DETECTING THE ULTRA-VIOLET COMPONENT OF SOLAR RADIATION, shows a sunburn warning device and has a filter to reject solar radiation of wavelength longer than 3,000 angstroms (300 nanometers). An integrator circuit is shown.

SUMMARY OF THE INVENTION

It has now been found that a low-cost, disposable, continuous reading, integrating sunburn dosimeter may be formed by using a chemical compound which has irreversible color changes from incident radiation in the region of 290 to 320 nanometers with the color change being a function of the total exposure to radiant energy in this sunburn region of 290 to 320 nanometers. As the color change is preferably irreversible and a function of the cumulative dose, a color is obtained which is correlated to the integrated value of the burning effect of the sun's rays on the human skin, so that by comparing the color change resulting from incident radiation at a given time and place with a calibration panel of color changes, the cumulative effects of the sun's rays on human skin may be closely estimated in time to avoid over exposure. The skin itself requires several hours for the full burning effect of over exposure to become apparent.

Because the skin of different individuals varies greatly in sensitivity to the sun, a factor must be introduced for the particular individual under consideration. The blonde Nordic types that have not been exposed to much radiation for a long time as, for example, after a hard winter, are much more sensitive to the burning rays of the sun than, for example, individuals who are basically brunette or dark skinned and who have been exposed to the tanning rays of the sun for a long period in the summer. For instance, a life guard who has been out in the sun for most of the swimming season is well known to have a skin which is much more resistant to the burning rays of the sun than the same individual at the beginning of the season. Negroes are susceptible to sunburn; although the reddening of the dark skin is more difficult to observe, it is just as painful.

Hence, with the present device, a factor must be introduced depending on the particular individual and the sensitivity of the skin of the individual, but the color changes from the burning rays of the sun on the present device give a comparatively accurate estimate as to the total amount of radiation which has been received on the device within the 290 to 320 nanometer range, and if a user classifies himself by observation or by trial and error into which group of subjects he belongs, the present device permits the user to determine when the total exposure is approaching the range which will result in too much sunburn.

Because the upper layers of a dosimeter in turning dark may protect the lower layers from the effect of the sun, the change in color may not and need not be a straight line function of ultraviolet exposure. A logarithmic scale would be very useful. By having calibration zones against which the darkening effect is measured by comparison, the user is readily apprised of the incipient dangers of undue exposure to the sun, independent of the color change curve.

In many instances a slight reddening is considered quite desirable by the subject as it indicates the exposure which leads towards a tan without pain or sensitization of the skin. As the color of the skin becomes a brighter red, so does the tenderness, pain, and danger from peeling or blistering.

Because the effects of the sun's rays on the skin are cumulative and delayed, it is desirable that the present integrating instantaneous reading of sunburn dosimeter be used to give the user an indication of what will be the effect of the exposure to the sun after the several hours of delay between exposure and maximum reaction of the skin.

Whereas the present device is primarily designed to indicate the exposure to radiation from the sun, radiation from other sources may also be similarly measured to determine the burning (erythemal) action of the ultraviolet radiation content. Because of the filtering action of the atmosphere, the average user on the earth's surface need not be concerned with radiation from the sun appreciably shorter than 290 nanometers. In outer space, or at the earth's surface where the source of the ultraviolet radiation is an electric arc, a gas discharge tube, or other ultraviolet source, radiation shorter than 290 nanometers may be of importance. The earth's atmosphere is increasingly opaque as the wavelength shortens from 290 nanometers to about 200 nanometers. Radiation shorter than 200 nanometers is known as the "vacuum UV", because this is the region in which the radiation must pass through a vacuum because the air is sufficiently opaque that even a short air-gap in the path of the ultraviolet radiation results in the radiation being absorbed. The present sunburn dosimeter is sensitive to radiation shorter than 290 nanometers, so if the ultraviolet source is sufficiently close to the subject that the air does not absorb the radiation, the present device will indicate the burning action of such radiation in time for the user to take appropriate action. Some plastics do not pass radiation much shorter than 290 nanometers, so the transparency of the plastic container or matrix for the dosimeter compound to a radiation region is a factor in its ability to function. The opaqueness of the plastic can be used as a filter factor to achieve appropriate response from the dosimeter compound. Some so-called sunlamps and other sources generate sufficient ultraviolet in the range shorter than 290 nanometers to burn the skin in only a few minutes so appropriate measurement and action must be considered by the user.

Two systems may be used to give effective readings of the burning rays of the sun or other source which are shorter than 320 nanometers.

A first and extremely convenient system is to use a compound which exhibits a darkening only from radiation shorter than 320 nanometers. The oxazolidine diones disclosed in U.S. Pat. No. 3,671,239, Zweig, June 20, 1972, PHOTODECOMPOSITION OF OXAZOLIDINE-DIONES AND SIMILAR ANHYDRIDES, includes compounds which are primarily sensitive to radiation shorter than 320 nanometers. Example 5 of said U.S. Pat. No. 3,671,239 describes the synthesis of 3'-[p-dimethylamino)phenyl]-spiro-[fluorene-9,4'-oxazolidine]-2',5'-dione. Under ultraviolet light this decomposes to p-dimethylamino-N-fluoren-9-ylidine aniline.

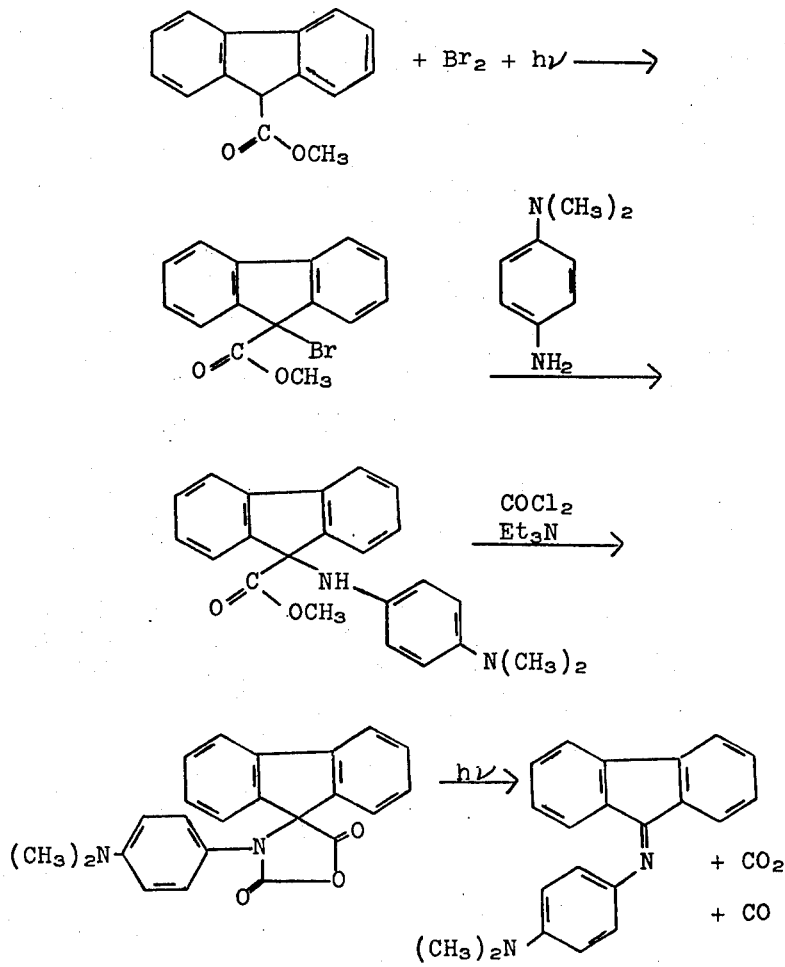

The synthesis is also set forth with some absorption curves in W. A. Henderson, Jr. and A. Zweig, Tetrahedron, 27, 5307 to 5313, Pergamon Press 1971 (Gt. Britain), PHOTOCHEMICAL GENERATION OF IMINES FROM AZASUCCINIC ANHYDRIDES.

A second method is to use a compound which absorbs not only from 320 nanometers down but also at longer wavelength and filtering the wavelengths longer than 320 nanometers. The photochromic compound is irradiated only by the shorter wavelength radiation. Compounds such as 1-acetoxy-2,2-dicyano-1,2-dihydro-4-methyl-1-phenyl-9-xanthenone, respond rapidly to the erythemal shorter wavelengths to irreversibly generate an orange-yellow { 2-[3-($\alpha$-acetoxybenzylidene)-3,4-dihydro-4-oxo-2H-1-benzopyran-2-ylidene]propylidene } malononitrile. U.S. Pat. No. 3,534,063, Huffman and Ullman Oct. 13, 1970, PHOTOCHROMIC CYCLOHEXADIENE COMPOUNDS, discloses such compounds and their synthesis. The above compound is shown in Example 26 thereof where it is named 1-acetoxy-4-methyl-9-oxo-1-phenyl-2,2[1H]-xanthenedicarbonitrile. The equation for the decomposition appears to be:

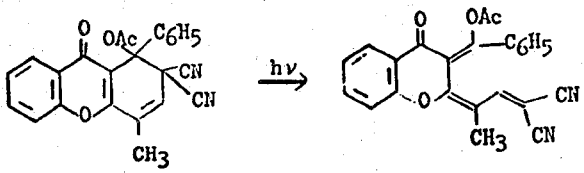

The color development is comparatively linear. The absorption spectrum of said xanthenone extends to wavelengths longer than 365 nanometers. The compounds darken in room light with no erythemal rays present. With a filter to protect from wavelengths longer than 320 nm, the coloration from the shorter wavelengths may be used for the detection of the burning rays of the sun.

For any system, the compound absorbing radiation shorter than 320 nanometers must be comparatively sensitive to such radiation in order that changes occur with the intensity of ultraviolet in the sunlight at dose levels of interest in sunburn control and, additionally, the decomposition product must absorb in the visible if a visible color change is to be detected by the human eye.

Color standard comparison panels are placed adjacent to the test zone so that a color standard is adjacent to the test zone for visible comparison by the user. The color standard panel or panels can be a paper or plastic on which is printed or in which is incorporated the color standards. Preferably, the color standard is a plastic of approximately the same visual appearance as the test zone or a container having the same appearances as test zone with a comparison concentration of dye therein so that on inspection only the depth of color is to be considered as all other visual characteristics of the color standard panel in the test zone are identical. By having the reflectance or shininess and all other characteristics the same, even an unskilled and untrained eye can rapidly evaluate which of one or more color standard panels comes closest to matching the test zone and with a minimal of interpolation, a useful reading of the effects of the burning rays of the sun is obtained.

Further details of specific embodiments of the present invention are found from the consideration of the following examples in which all parts are by weight unless otherwise clearly stated and the accompanying drawings.

EXAMPLE I

Figure 1:
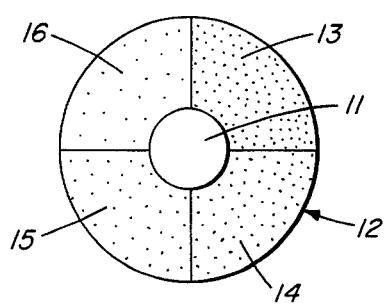
FIG. 1 is a round test zone surrounded by four comparison panels.

A solution of 5 parts 3'-[p-(dimethylamino)phenyl]-spiro-[fluorene-9,4'-oxazolidine]-2',5'-dione and 95 parts of poly(ethyl acrylate) resin, sold as Elvacite 2042 acrylic resin, in 900 parts of a 1:1 (V:V) toluene: methyl ethyl ketone mixture was coated on a clear polyester film base (Mylar) with a doctor blade so that the dried coating was 3.0 mil thick. When exposed normally to sunlight beginning at 10 a.m. on a clear day in mid-April in Stamford, Conn., the initially colorless film developed a red color. The optical density of the film at 480 nm (at or near the visible absorption maximum responsible for the red color) was:

0.29 after 30 minutes,
0.40 after 60 minutes,
0.58 after 120 minutes, and
0.70 after 240 minutes.

As shown in FIG. 1, a portion of the film so produced was cut to a circle about half inch in diameter and placed as the test zone 11 on a support panel 12 having printed on its surface four color standard panels. Panel 13, sensitive skin zone, matched the color of the test zone read after 30 minutes on a clear mid-April day in Stamford, Conn.; Panel 14, average skin, matched the color obtained after 60 minutes; Panel 15, resistant skin, matched the color obtained after 120 minutes; Panel 16, well tanned skin, matched the color obtained after 240 minutes.

EXAMPLE II

A solution of 10 parts of 3'-[p-(dimethylamino)-phenyl]-spiro-[fluorene-9,4'-oxazolidine]-2',5'-dione and 90 parts of polycarbonate resin (Lexan 101) in 400 parts of methylene chloride was coated on a clear polyester film base (Mylar) using a doctor blade, so that when dried the coating was 1.5 mils thick.

On exposure to the sun beginning at 10 a.m. on a clear day in mid-April at Stamford, Conn. (latitude 41°N and about 100' above sea level), the optical density of the film measured at 480 nm was:

0.56 after 80 minutes,
0.98 after 160 minutes, and
1.22 after 260 minutes.

Figure 2:
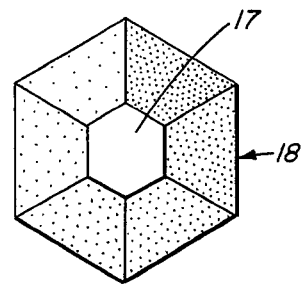
FIG. 2 shows a hexagonal test zone with six comparison panels.

As shown in FIG. 2, a portion of the thus prepared film before exposure was shaped as a small hexagon about ½ inch across flats 17, and centered on a hexagonal panel 18, which panel had six color standards on areas divided on lines from the center to the six corners, with the test panel 17 being mounted with its edges parallel to the color standard panel. The color standard panels were matched to six different exposure levels:
1. Very Sensitive skin
2. Sensitive skin
3. Average unexposed skin
4. Average slightly tanned skin
5. Well tanned skin
6. Resistant well tanned skin Obviously, the exact depths of color is based on a somewhat arbitrary standard. Using such arbitrary standards, and being consistent, permits a user to complete the key step of classifying his own skin against the standards. The user can subject his skin to increasing dosage of ultraviolet until the user finds the lowest dose that causes perceptible redness and then, allowing for the additional resistance of his skin resulting from tanning, the user can accurately estimate when his maximum desired dosage of radiation has been reached and take appropriate action.

Because the skins of all subjects do not tan at the same rate, the individual must allow for variations. In some a large number of slightly increased dosages are required for tanning, in others rapid increases in dosages are acceptable.

The dosimeter permits the user to ascertain exposure levels but the user must use discretion in determining whether or not the user's skin is becoming tanned and, hence, more resistant to ultraviolet radiation.

In use, the device is exposed to approximately the same radiation as the user's skin. For use at the beach, the device can be placed on a swim cap, the clothing of the user, or a beach blanket. For exposure under other conditions, the user can select conditions such that the test zone is subjected to approximately the same radiation dosage as the user's skin. If the user is tanning both front and back, as in beach tanning, the user can adjust his estimate to allow for the fractional exposure of a skin area as compared with continuous exposure of the test zone.

Figure 3:
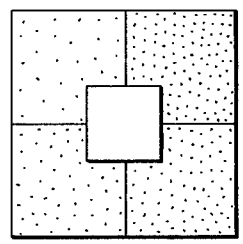
FIG. 3 shows a square test zone with surrounding test panels.

FIG. 3 shows a square test zone and four color standard panels.

Figure 4:
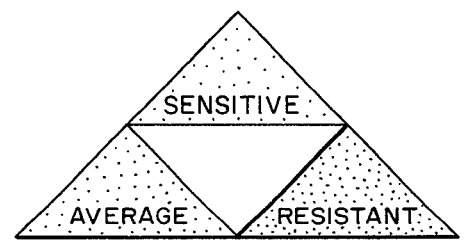
FIG. 4 shows a triangular test zone with three adjacent comparison panels.

FIG. 4 shows a triangular test zone and three color standards with labels on the color standard panels.

Figure 5:
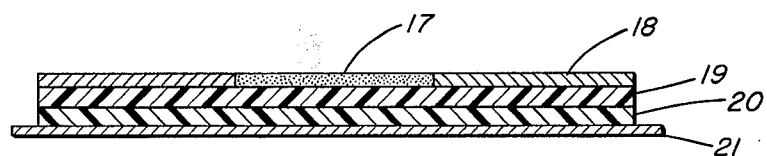
FIG. 5 shows in section the test zone, the comparison panels and backing and support materials.

FIG. 5 is a cross section of the dosimeter of FIG. 2 showing the test zone 17 surrounded by the color standard panel 18 attached to a support panel 19. On the lower side of the support panel 19 is a pressure sensitive adhesive layer 20 which is protected by a release paper layer 21. The user may pin or otherwise hold the dosimeter in position, or conveniently, by stripping off the release paper layer, the pressure sensitive adhesive layer permits the panel to adhere to a desired location.

EXAMPLE III

A solution of 10 parts of 1-acetoxy-2,2′dicyano-1,2-dihydro-4-methyl-1-phenyl-9-xanthenone and 90 parts of acrylic resin (Elvacite 2042) in 900 parts of a 1:1 (V:V) toluene: methyl ethyl ketone mixture was coated on a polyester film base (Mylar) and dried as in Example I. Under equal exposure conditions under a Xenon lamp, this film was observed (visually) to develop color more rapidly than the film in Example I.

The film is sensitive to wavelengths above 320 nm and may be protected from these by a filter. Chemical substances which can be used in such a filter include the following:

1. 4-methylcyclopenta [C] quinolizine
2. Di-[3-methyl-2-benzothiozole]azamethincyanine tetrafluoroborate
3. 2-Aminoquinoline
4. 3,5,6-Trimethyl-1,2,4-triazine
5. 1-cyanopyrene
6. Thiochroman-4-one
7. Sodium Dithioacetate
8. Phorone
9. 2-hydroxybenzophenone
10. 2-aminobenzophenone
11. 4-hydroxycinnoline A dichroic filter gives the most predictable results, but is somewhat more expensive.

EXAMPLE IV

A film containing 5 parts of 3,4,4,-triphenyl-oxazolidine-2,5-dione and 95 parts of poly(ethyl acrylate) resin on a clear polyester film base was prepared in the manner described in Example I. Exposure of this film normal to sunlight beginning at 10 a.m. on a clear day in mid-April in Stamford, Conn., showed the initially colorless film developed a yellow color. This color darkened with continued exposure, becoming deeply yellow by 2 p.m.

EXAMPLE V

3′-[p-(dimethylamino)phenyl]-spiro-[fluorene-9,4′-oxazolidine]-2′,5′-dione

To 18.0 ml. of N,N-dimethylphenylenediamine in 30 ml. of benzene was added with stirring 12.1 gms. of methyl 9-bromofluorene-9-carboxylate. The mixture was kept at 50° overnight and then filtered. Most of the benzene was distilled off and 20 mls. of ethyl ether added to precipate the amino acid ester which was obtained in a 12.8 gm. yield with a melting point of 126°–130°C.

A 10.0 gm. portion of the amino acid ester and 8 ml. of triethylamine were dissolved in 100 ml. of toluene to which was added 10 ml. of phosgene.

Because of the toxicity of phosgene, suitable precautions are essential.

The mixture was stirred for 4 hours at room temperature using a dry ice trap on the vent. The solution was then filtered to remove amine hydrochloride. The toluene, triethylamine and excess phosgene were evaporated off and the residue heated under nitrogen to 150°C. for 10 minutes. The product was recrystallized twice from acetone yielding 4.22 gms. of colorless crystals of 3′-[p-(dimethylamino)phenyl]-spiro-[fluorene-9,4′-oxazolidine]-2′,5′-dione having a melting point of 293°–294°C.

The calculated analysis for $C_{23}H_{18}N_2O_3$ is carbon 74.58, hydrogen 4.90, nitrogen 7.56. Found: carbon 73.97, hydrogen 5.30, nitrogen 7.56.

The concentration of photochromic materials and the matrix may vary. A polycarbonate matrix is particularly convenient to use and gives good results. The size of the test panel and the size of the color standard panels may vary widely depending on the location and size desired by the user. The assembled dosimeters including the test zone and color standards are conveniently assembled in blister packages for sale to the ultimate user with the user removing individual dosimeters for separate use on different days of exposure.

Because the human skin recovers to a considerable extent from the effect of radiation from day to day, it is desirable that a new dosimeter be used on each day. The package conveniently contains instructions to aid in correlating the dosimeter readings with the type of skin and sensitivity of skin and tanning of skin of the individual user.

Other types of packages may be used. The test zone can be a separate element and assembled to the color standard panels at the time of use. The test zone may only be placed adjacent to the color standard panel when a comparison is needed, or other variations. A single unitary disposable device is usually the most convenient, and the cost is acceptably low.

Such systems of packaging and use and detailed instructions vary with contemplated uses but are within the scope of the present disclosures.

I claim:

1. A disposable continuous reading integrating sunburn dosimeter for giving a rapid visual estimation of the cumulative sunburning action of exposure to radiant energy in the sunburn region of about 290 to 320 nanometers which comprises a test zone having therein a chemical compound showing irreversible color changes from incident radiation in the region of about 290 to 320 nanometers, and, adjacent thereto, at least one color standard panel which is of a color attained by the test zone after a predetermined radiation exposure, so that by rapid visual observation, the color intensity developed by the test zone is compared with the color of the color standard panel.

2. The dosimeter of claim 1 in which the test zone is a plastic having dispersed therein 3'-[p-(dimethylamino)-phenyl]-spiro-[fluorene-9,4'-oxazolidine]-2',5'-dione.

3. The dosimeter of claim 2 in which the color standard panel has at least three areas having colors corresponding to a minimum erythemal dose of burning radiation, an average tanning dose of burning radiation, and a protected skin dose of burning radiation.

4. The dosimeter of claim 1 in which the test zone is a container having therein a solution of 3'-[p-(dimethylamino)phenyl]-spiro-[fluorene-9,4'-oxazolidine]-2',5'-dione.

5. The dosimeter of claim 1 in which the test zone is a plastic having dispersed therein 1-acetoxy-2,2-dicyano-1,2-dihydro-4-methyl-1-phenyl-9-xanthenone, and means to protect the same from radiation having a wavelength longer than 320 nanometers.

6. The dosimeter of claim 3 in which the plastic is a polycarbonate.

7. A method for visually, rapidly estimating the cumulative sunburning effect of exposure of the human skin to radiant energy in the sunburn region of about 290 to 320 nanometers and to give warning of an overdose which comprises exposing a test zone of a plastic having therein a chemical compound showing irreversible color changes from incident radiation in the region of about 290 to 320 nanometers, and, having adjacent to the test zone at least one color standard which is of a color attained by the test zone after exposure to a predetermined radiation dose in the range of 290 to 320 nanometers, comparing the test zone with the color standard to determine when the test zone has received a predetermined dose of radiation in the range of 290 to 320 nanometers, and thus give warning of the need to protect said skin from further exposure to radiation in the 290 to 320 nanometers region after said predetermined radiation exposure has been reached.

8. The method of claim 7 in which the test zone is a polycarbonate plastic having dispersed therein 3'-[p-(dimethylamino)phenyl]-spiro-[fluorene-9,4'-oxazolidine]-2',5'-dione.

* * * * *